United States Patent
French et al.

(10) Patent No.: US 12,052,242 B2
(45) Date of Patent: Jul. 30, 2024

(54) SYSTEM FOR ASSIGNING AND DISTRIBUTING DEVICE SECURITY SEGMENT IDENTIFICATION

(71) Applicant: Arista Networks, Inc., Santa Clara, CA (US)

(72) Inventors: John French, Pacifica, CA (US); Manish Singhvi, Jodhpur (IN)

(73) Assignee: ARISTA NETWORKS, INC., Santa Clara, CA (US)

( * ) Notice: Subject to any disclaimer, the term of this patent is extended or adjusted under 35 U.S.C. 154(b) by 512 days.

(21) Appl. No.: 17/327,128

(22) Filed: May 21, 2021

(65) Prior Publication Data

US 2022/0321560 A1     Oct. 6, 2022

(30) Foreign Application Priority Data

Apr. 2, 2021  (IN) .............................. 202141015747

(51) Int. Cl.
| | |
|---|---|
| *H04L 9/40* | (2022.01) |
| *H04L 61/5007* | (2022.01) |
| *H04L 47/20* | (2022.01) |
| *H04L 101/622* | (2022.01) |

(52) U.S. Cl.
CPC ...... *H04L 63/0869* (2013.01); *H04L 61/5007* (2022.05); *H04L 47/20* (2013.01); *H04L 2101/622* (2022.05)

(58) Field of Classification Search
CPC ............. H04L 63/0869; H04L 63/0876; H04L 63/162; H04L 63/0892; H04L 61/5007; H04L 61/103; H04L 47/20; H04L 2101/622
See application file for complete search history.

(56) References Cited

U.S. PATENT DOCUMENTS

| | | | | |
|---|---|---|---|---|
| 6,118,771 | A * | 9/2000 | Tajika | H04L 45/16 370/328 |
| 9,264,351 | B2 * | 2/2016 | de Silva | H04L 45/586 |
| 11,382,101 | B1 * | 7/2022 | Chu | H04L 5/0044 |

(Continued)

FOREIGN PATENT DOCUMENTS

| | | | | |
|---|---|---|---|---|
| CN | 106412142 A | * | 2/2017 | ............. H04L 12/66 |
| EP | 2207321 B1 | * | 5/2012 | ......... H04L 12/4633 |

*Primary Examiner* — Lynn D Feild
*Assistant Examiner* — Abdullah Almamun
(74) *Attorney, Agent, or Firm* — Fountainhead Law Group, P.C.

(57) ABSTRACT

In general, the disclosure relates to a method for creating segment mapping in a network, by a network device. The method includes receiving a segment identification (ID) for a client device of the network from an authentication system. The segment ID identifies a segment of the network including the client device and the network device wherein the segment ID is associated with a media access control (MAC) address of the client device. The network device or a network management system (NMS) determines an internet protocol (IP) address of the client device and the network device creates an IP address to segment ID mapping for the client device using the IP address. The IP address to segment ID mapping is provided to the NMS for distribution to remaining network devices of the network. At least one packet of the client device is processed using the IP address to segment ID mapping.

20 Claims, 7 Drawing Sheets

(56) References Cited

U.S. PATENT DOCUMENTS

| | | | |
|---|---|---|---|
| 2004/0158780 A1* | 8/2004 | Conrad | H04L 41/22 |
| | | | 714/100 |
| 2012/0030351 A1* | 2/2012 | Fukushima | H04L 63/101 |
| | | | 709/224 |
| 2014/0169377 A1* | 6/2014 | Shuai | H04L 45/7452 |
| | | | 370/392 |
| 2019/0306108 A1* | 10/2019 | Wang | H04L 12/4625 |
| 2022/0255837 A1* | 8/2022 | Sun | H04L 45/76 |
| 2023/0198885 A1* | 6/2023 | Huang | H04L 45/26 |
| | | | 370/254 |

* cited by examiner

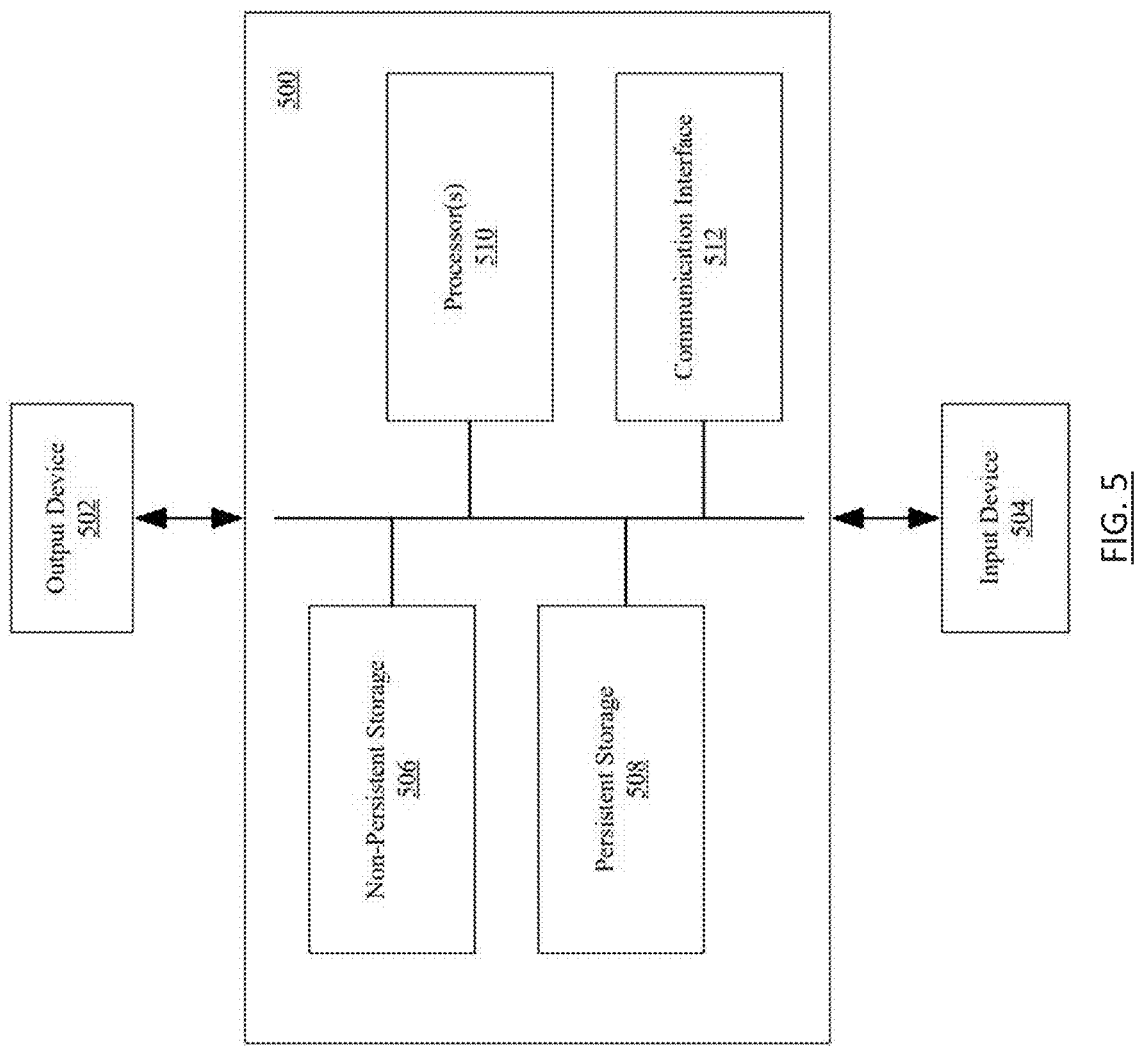

SYSTEM FOR ASSIGNING AND DISTRIBUTING DEVICE SECURITY SEGMENT IDENTIFICATION

BACKGROUND

Network segmentation, a feature readily employed in certain networks, serves to logically divide components of a network, i.e., network devices (e.g., switches), based on functionality or another criterion. Some but not all segments are mapped to the address or identification of the network devices. The network devices typically interoperate with authentication systems to authenticate client devices (e.g., hosts). But not all authentication systems have the requisite data to effectuate segmentation. The unawareness of the authentication system may prevent the interoperability of network devices with certain authentication systems

BRIEF DESCRIPTION OF DRAWINGS

FIG. 5 shows an example host in accordance with one or more embodiments of the disclosure.

DETAILED DESCRIPTION

Figure 1:
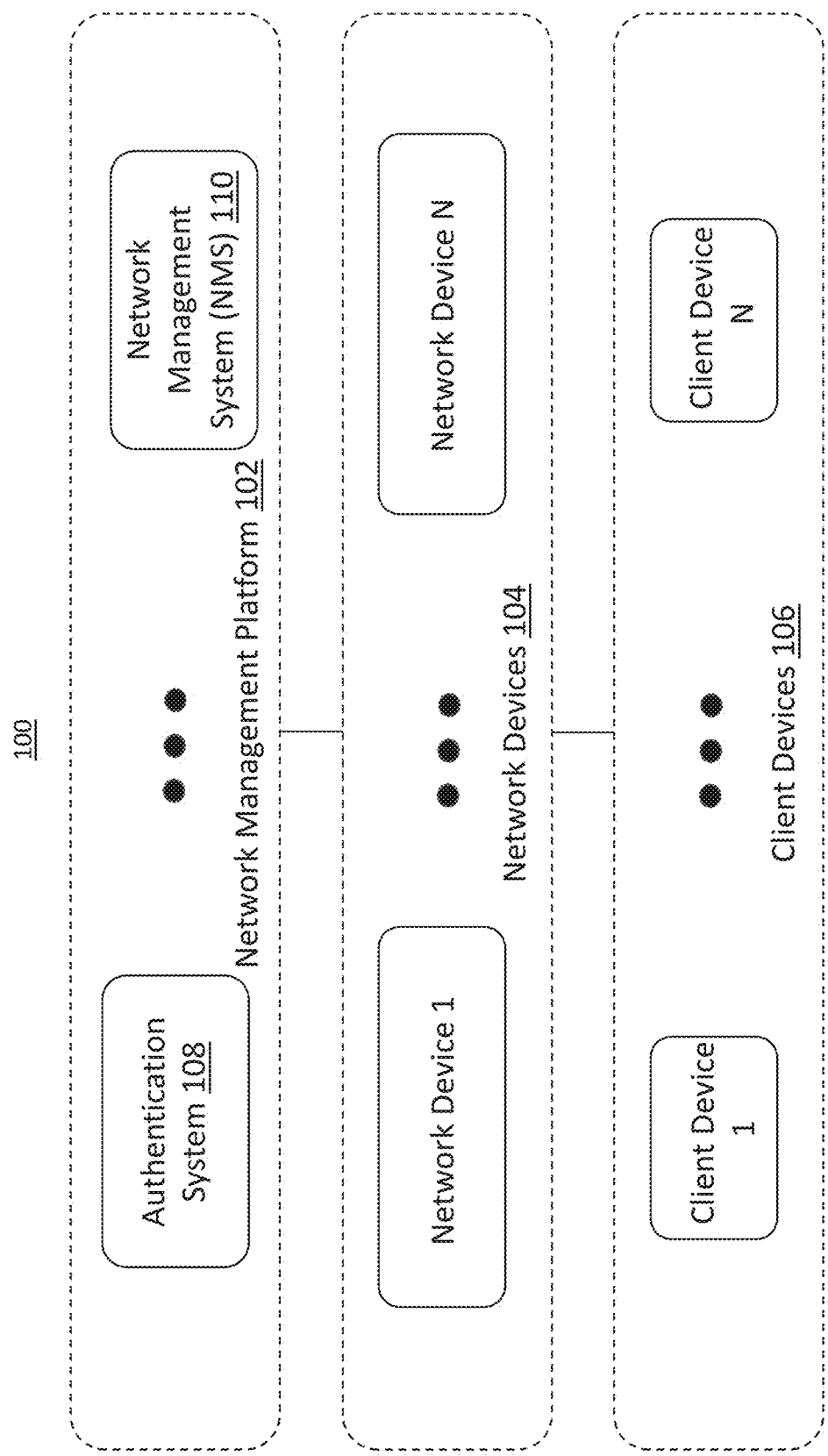
FIG. 1 shows an example system in accordance with one or more embodiments of the disclosure.

Specific embodiments will now be described with reference to the accompanying figures.

Network segmentation can be an effective security improvement measure. Splitting a computer network into subnetworks with each subnetwork serving as one or more network segments can create clear delineation of traffic within the network. An example is the separation of the traffic flowing to and from a financial branch or office of an organization to and from other offices, departments or branches of the same organization to limit the number and identity of the employees with access to sensitive financial information. In this case, a subnetwork is created for financial information flow, separate and apart from the other subnetworks or other parts of the larger network to which the subnetwork belongs.

An exemplary security policy may entail segmenting the network into multiple zones (subnets) with varying security requirements and enforcing a policy on each zone. Segmentation policies come in various flavors including controlling traffic flow among network devices such as the prevention of all traffic of one part of the network from reaching one or more other parts of the network. In the same vein, additionally or alternatively, certain traffic restrictions may be enforced as a part of the same or a different policy such as one in accordance with traffic type, traffic source, traffic destination, among other traffic attributes.

A network device address mapping to a particular segment of the network can be vital in identifying segments accessed by client devices, but, currently, such mapping is a rather cumbersome pursuit. Internet protocol (IP) to segment identification (ID) mapping without application programming interface (API) integration is nearly non-existent. For example, a remote authentication dial-in user service (RADIUS)-based server is not necessarily aware of a client device IP address due to certain known security protocols, such as those implemented to meet the 802.1× and medium access control (MAC) address-based authentication (MBA). These protocols generally require sharing MAC addresses but not sharing IP addresses. Accordingly, IP addresses may remain invisible to a participating network device.

Some authentication systems may become aware of a device IP through mirroring, polling mechanisms, or metadata features, or they may even be informed of the device IP by a network device (e.g., a switch) through authentication accounting after the completion of an authentication process. However, requiring an application programming interface (API) to facilitate the exchange of device IP information with a segment identification (ID) that identifies a corresponding segment typically requires additional product feature development particularly on the authentication system, a potentially costly and unpredictable venture.

To address one or more of the aforementioned limitations, a mechanism for enabling IP address to segment ID mapping is disclosed herein. The mapping does not require an API. In a scenario where it would be advantageous for a network device (e.g., a switch) to create a mapping between a segment ID and an IP address, the network device may interact with an authentication system to obtain a client MAC address-segment ID mapping for a client connected to the network device. The network device may then generate the client IP-segment ID address mapping one of two ways, as further described below.

A network device may be required to identify the interne protocol (IP) address of another network device. For example, the network device may implement address locking, an approach that is currently limited to switches bridging a virtual local access network (VLAN) rather than routing traffic. The network device may also or alternatively implement an address resolution protocol (ARP) table feature for performing routing. The system may yet alternatively or additionally employ a network management system (NMS) that collects MAC address-segment ID mappings and employs these mappings, along with corresponding IP address-MAC address mappings (which may be learned via various mechanisms), to generate IP address-segment ID mappings. Stated differently, a network device may facilitate identification of the IP address of another network device, but in cases where it cannot, an NMS feature may be employed to accomplish identification of the network device IP address. The NMS may then distribute the IP address-segment ID mapping to one or more network devices in the network. Regardless of the manner in which the IP address-segment ID mappings are generated, the NMS may be used to distribute the IP address-segment ID mapping to the various network devices in the network. In this manner, the authentication system does not require additional feature development to take advantage of the foregoing segmentation mapping feature. Moreover, the network device and NMS may be compatible with a variety of security-based authentication systems without the requirement for new feature design. Yet the authentication system maintains its capability to determine the network security posture (segment ID).

Various embodiments of the disclosure are described below.

FIG. 1 shows an example system in accordance with one or more embodiments of the disclosure. The system (100) includes a network management platform (102) communicatively coupled to one or more network devices (104) (e.g., network devices 1, N), which are in turn communicatively coupled to one or more client devices (106), (e.g., client devices 1, N).

The network management platform (102) includes an authentication system (108) and a network management system (NMS) (110). The network devices (104) include network device 1 through network device N where "N" represents an integer value. The client devices (106) include client device 1 through client device N where "N" represents an integer value.

In some embodiments of the disclosure, the system (100) is a network that may be the medium through which the network management platform (102), the network devices 104, and the client devices (106) are operatively connected. In one embodiment of the disclosure, the system (100) may include other network devices (or systems) (not shown) that facilitate communication between the aforementioned components. As such, in one embodiment of the disclosure, the network may include any combination of local and/or wide area (e.g., Internet) network segments that may be wire-based and/or wireless and that may use any combination of wired and/or wireless communication protocols. In the interest of simplicity and without limitation, the system (100) is presumed to include a single network.

In one or more embodiments of the disclosure, the authentication system (108) includes a remote authentication dial-in user service (RADIUS) server and the network management system (NMS) (110) is a cloud service. In one or more embodiments of the disclosure, each of the network devices 1-N may be configured as a switch; each of the one or more of the client devices (106) may be configured as a server.

In some embodiments, the NMS and the authentication system may be two functions in the same system or product. For example and without limitation, they may be part of a single physical or virtual network device (e.g., network device 1 or network device N) yet logically separate devices whose information is not directly coupled to one another.

In some embodiments of the disclosure, the authentication system (e.g., 108) of the network management platform (e.g., 102) comprises an authentication server that is a physical or virtual device that may be used for facilitating various embodiments of the disclosure. The physical device may correspond to any physical system with functionality to implement one or more embodiments of the disclosure. For example, the physical device may be a computing device (i.e., a device with at least one or more processor(s), memory, and an operating system) that is directly or otherwise connected to a network device (e.g., one of the network devices (104)) for receiving and responding to requests from a network device (e.g., one of the network devices (104)). For example, the authentication system may receive a request for authentication of a client device from a network device and in response, the authentication system may return notification of successful authentication of the client device with a MAC address to segment ID mapping corresponding to the client device. In some embodiments of the disclosure, the authentication system may authenticate more than one client device through the network device simultaneously, in tandem, serially, or at disparate times. For example, the authentication system may authenticate one of the client devices through one or more network devices (104) (e.g., network device 1) at the same time, immediately after, or some other time subsequent to authenticating another one of the network devices of the authentication system (100) (e.g., network device N). In another example, the network device may authenticate a client device (e.g., one of the client devices 1 or N) with the authentication system.

In one or more embodiments of the disclosure, the authentication system (e.g., 108) includes executable instructions (stored in a non-transitory computer readable medium (not shown)), which when executed, upon successful completion of a user authentication session by a network device, issues a RADIUS change of authorization (CoA) message to the network device that initiated the authentication session to complete the authentication process to enable unrestricted access to a previously restricted network or vice versa. In another embodiment of the disclosure, a statically defined MAC address to segment ID mapping may be implemented In one or more embodiments of the disclosure, the authentication system (108) may be implemented as any type of computing device (see e.g., FIG. 5) with functionality for performing the methods and embodiments of the disclosure. The authentication system (108) may authenticate a user in various manners including, without limitation, in accordance with the IEEE 802.1x protocol—Extensible Authentication Protocol over Local Area Network (EAPoL) or media access control address (MAC)-based authentication (e.g., via the remote authentication dial-in service (RADIUS) protocol).

In one or more embodiments of the disclosure, the authentication system (108) includes executable instructions (stored in a non-transitory computer readable medium (not shown)), which when executed, enable the authentication system (108) to perform one or more methods described below (see e.g., FIGS. 2A, 2B, 3A, 3B, 4).

In one embodiment of the disclosure, the network management system (NMS) (e.g., 110) of the network management platform (e.g., 102) comprises an NMS server that is a physical or virtual device that may be used for facilitating various embodiments of the disclosure. The physical device may correspond to any physical system with functionality to implement one or more embodiments of the disclosure. For example, the physical device may be a computing device (i.e., a device with at least one or more processor(s), memory, and an operating system) that is directly or otherwise connected to one or more network devices (e.g., 104) for receiving, processing, and/or responding to requests for information, such as mapping information, from the network devices (104). For example, the NMS may receive IP address to segment ID mapping information from a network device and the NMS may then distribute the IP address to segment ID mapping information to the network device from which the NMS received the IP address to segment ID mapping information and/or one or more of the remaining network devices (e.g., of the network devices (104)) of the system (100) from which the NMS did not necessarily receive the IP address to segment ID mapping information. In another example, the NMS may receive MAC address to segment ID mapping information from a network device, determine the IP address corresponding to the MAC address from the MAC address to segment ID mapping information to obtain a corresponding IP address to segment ID mapping information and distribute the IP address to segment ID mapping information to the network device from which the NMS received the MAC address to segment ID mapping information and/or one or more of the remaining network devices (e.g. of the network devices (104)) of the system (100) from which the NMS did not necessarily receive the MAC address to segment ID mapping information. In some embodiments of the disclosure, the NMS may distribute an IP address to segment ID mapping or an updated IP address to segment ID mapping to network devices that are authenticated by an authentication system (108, FIG. 1)

In an example embodiment, the NMS may send data to a network device or distribute data to network devices using various processes such as, without limitation, passing messages or responses to messages to and from, respectively, the network device and the NMS or via a push-pull mechanism. In an example push-pull mechanism, the NMS and a network device may communicate through state-sharing.

In one or more embodiments of the disclosure, the NMS (110) may be implemented as any type of computing device (see e.g., FIG. 5) with functionality for performing the methods and embodiments of the disclosure.

In one embodiment of the disclosure, the NMS (110) includes executable instructions (stored in a non-transitory computer readable medium (not shown)), which when executed, enable the NMS (110) to perform one or more methods described below (see e.g., FIGS. 2A, 2B, 3A, 3B, 4).

In one embodiment of the disclosure, each of the network devices 1-N of the network devices (104) may be one or more computing devices functionally equipped to: (i) determine an internet protocol (IP)-segment identification (ID) mapping; (ii) provide the mapping to a network management system (e.g., 110); (iii) in some cases, identify an IP address of another network device; (iv) initiate an authentication session to authenticate a client device through a network device; and (v) implement an address resolution protocol (ARP) table feature for performing routing. At least one packet of the client device is processed using the IP address to segment ID mapping.

In one embodiment of the disclosure, each of the network devices 1-N of the network devices (104) is a physical or virtual device that may be used for performing various embodiments of the disclosure. The physical device may correspond to any physical system with functionality to implement one or more embodiments of the disclosure. For example, the physical device may be a switch (i.e., a device with at least one or more processor(s), memory, and an operating system) that is directly (or operatively, e.g., via the network) connected to at least one client device (e.g., client device 1-N of client devices (106)), an authentication system (e.g., 108), and a NMS (e.g., 110). In another embodiment, each of the network devices 1-N of the network devices (104) is a physical device that includes persistent storage, memory (e.g., random access memory), one or more processor(s), and two or more physical ports that may be a combination of ingress and egress ports.

Alternatively, a network device may be implemented as a physical device that may be a special purpose computing device that includes one or more application-specific processor(s) (or hardware) configured to only execute embodiments of the disclosure. In such cases, the physical device may implement embodiments of the disclosure in hardware as a family of circuits and may retain limited functionality to receive input and generate output in accordance with various embodiments of the disclosure. In addition, such computing devices may use a state-machine to implement various embodiments of the disclosure.

In another embodiment of the disclosure, the physical device, implemented as a network device, may correspond to a computing device that includes one or more general purpose processor(s) and one or more application-specific processor(s) (or hardware). In such cases, one or more portions of the disclosure may be implemented using the operating system and general purpose processor(s), while one or more portions of the disclosure may be implemented using the application-specific processor(s) (or hardware).

In one embodiment of the disclosure, each of the network devices 1-N of the network devices (104) includes executable instructions (stored in a non-transitory computer readable medium (not shown)), which when executed, enable the network device 1, N to perform one or more methods described below (see e.g., FIGS. 2A, 2B, 3A, 3B, 4).

In one embodiment of the disclosure, the persistent storage in the network device may include any type of non-transitory computer readable medium that includes instructions, which, when executed by one or more processor(s) in the network device, enable the network device to perform all or a portion of the functions described in accordance with one or more embodiments of the disclosure (see e.g., FIGS. 2A, 2B, 3A, 3B, 4).

Examples of a network device include, but are not limited to, a router, a switch, and a multilayer switch. The network device is not limited to the aforementioned specific examples. Additional detail about a network device is described below with respect to FIG. 5.

In one embodiment, each of the client devices (e.g., a client device of the client devices 1-N of client devices (106)) may be a host system including one or more computing devices functionally equipped to send network traffic for processing to one of the network devices (e.g., network device 1, N of network devices (104)). For example, the client device may generate traffic sourced from a MAC address identifying the client device to the requesting network device. In another example, the client device may take measures known in the art to solicit an IP address and provide the same to the requesting network device. At least one packet of the network traffic that the client device generates and transmits to the network device is processed using an IP address to segment ID mapping determined by the network device or by a NMS (e.g., 110, FIG. 1).

In one embodiment of the disclosure, each of the client devices (106) is a physical or virtual device that may be used for facilitating and/or performing various embodiments of the disclosure. The physical device may correspond to any physical system with functionality to implement one or more embodiments of the disclosure. For example, the physical device may be a server, a personal computer, a laptop, a smartphone, or a tablet (i.e., a device with at least one or more processor(s), memory, and an operating system) that is directly or otherwise connected to a network device (e.g., one of the network devices 104).

Alternatively, the physical device (e.g., client devices (106)) may be a special purpose computing device that includes one or more application-specific processor(s) (or hardware) configured to only execute embodiments of the disclosure. In such cases, the physical device may implement embodiments of the disclosure in hardware as a family of circuits and may retain limited functionality to receive input and generate output in accordance with various embodiments of the disclosure. In addition, such computing devices may use a state-machine to implement various embodiments of the disclosure.

In another embodiment of the disclosure, the physical device (e.g., client devices (106)) may correspond to a computing device that includes one or more general purpose processor(s) and one or more application-specific processor(s) (or hardware). In such cases, one or more portions of the disclosure may be implemented using the operating system and general purpose processor(s), while one or more portions of the disclosure may be implemented using the application-specific processor(s) (or hardware).

In one embodiment of the disclosure, each of the client devices (106) includes executable instructions (stored in a non-transitory computer readable medium (not shown)), which when executed, enable the corresponding client device to perform one or more methods described below (see e.g., FIGS. 2A, 2B, 3A, 3B, 4).

While FIG. 1 shows a particular system architecture, the disclosure is not limited to the system architecture shown in FIG. 1. For example, while FIG. 1 shows one authentication server, one captive portal, and one network device, implementations of the disclosure may include one or more of each of the aforementioned elements without departing from the disclosure.

Figure 2A:
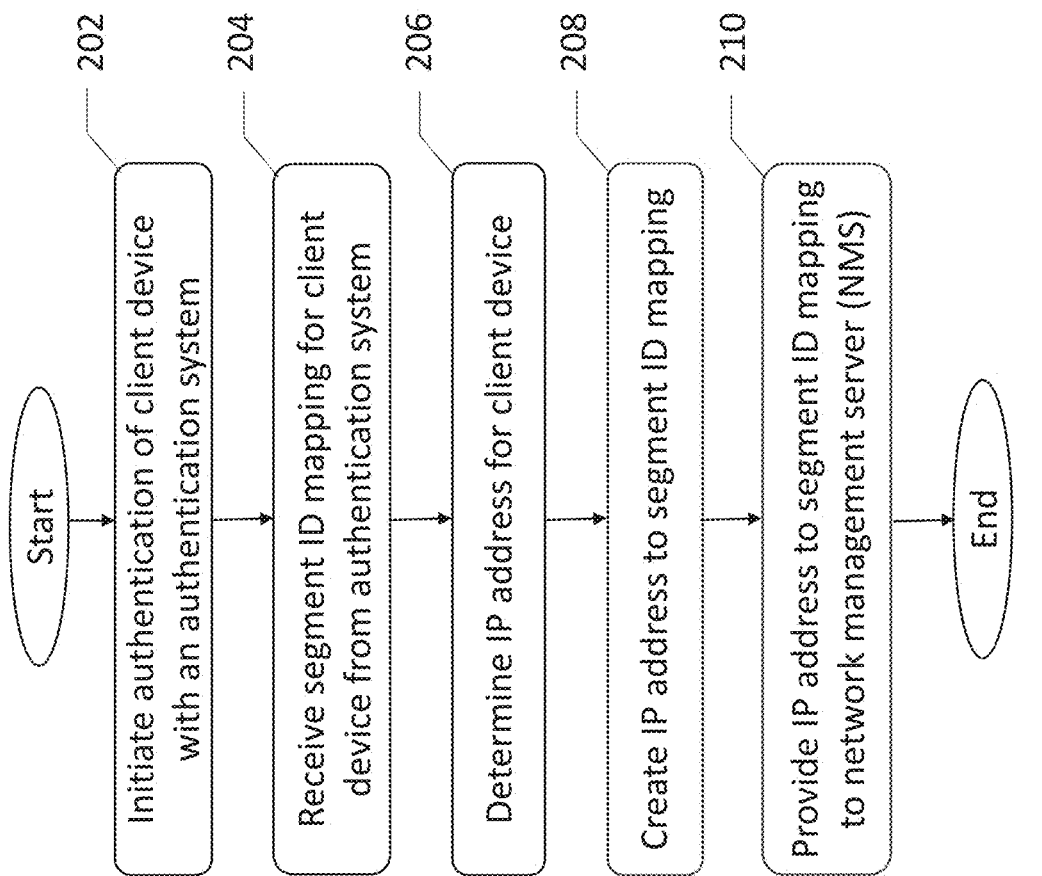
FIG. 2A shows a method, performed by a network device, for providing an IP address to segment identification (ID) mapping (internet protocol (IP) address-segment ID) to a network management system (NMS) in accordance with one or more embodiments of the disclosure.

FIG. 2A shows a method, performed by a network device, for providing an IP address to segment ID mapping (IP address-Segment ID) to a NMS in accordance with one or more embodiments of the disclosure. While the various steps in the flowchart shown in FIG. 2A are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

With reference to FIG. 2A, at step 202, a network device initiates authentication of a client device (e.g., one of the client devices 106, FIG. 1) with an authentication system (e.g., 108, FIG. 1).

At step 204, the network device receives a segment ID mapping for the client device from the authentication system. In an embodiment of the disclosure, the segment ID mapping is a mapping of the MAC address of the client device to the segment ID identifying an accessed segment, for example, a segment named "employee." Access to segment ID "employee" may be restricted for security reasons to only those client devices of employees who ought to have access to information from the corresponding segment. At step 206, the network device may take measures to determine the client device's IP address. The network device may do so in a variety of manners. In an embodiment of the disclosure, the IP address of the client device is determined in accordance with dynamic host configuration protocol (DHCP).

At step 208, the network device creates an IP address to segment ID mapping using the MAC address to segment ID mapping obtained in step 204 and the IP address to MAC address mapping obtained at step 206. In an embodiment of the disclosure, the network device may save the IP address to segment ID mapping determined at step 208 in local storage (not shown) or a storage location externally situated relative to the network device and coupled, associated with or otherwise incorporated into the network device. At step 210, the network device provides the IP address to segment ID mapping to the NMS.

Figure 2B:
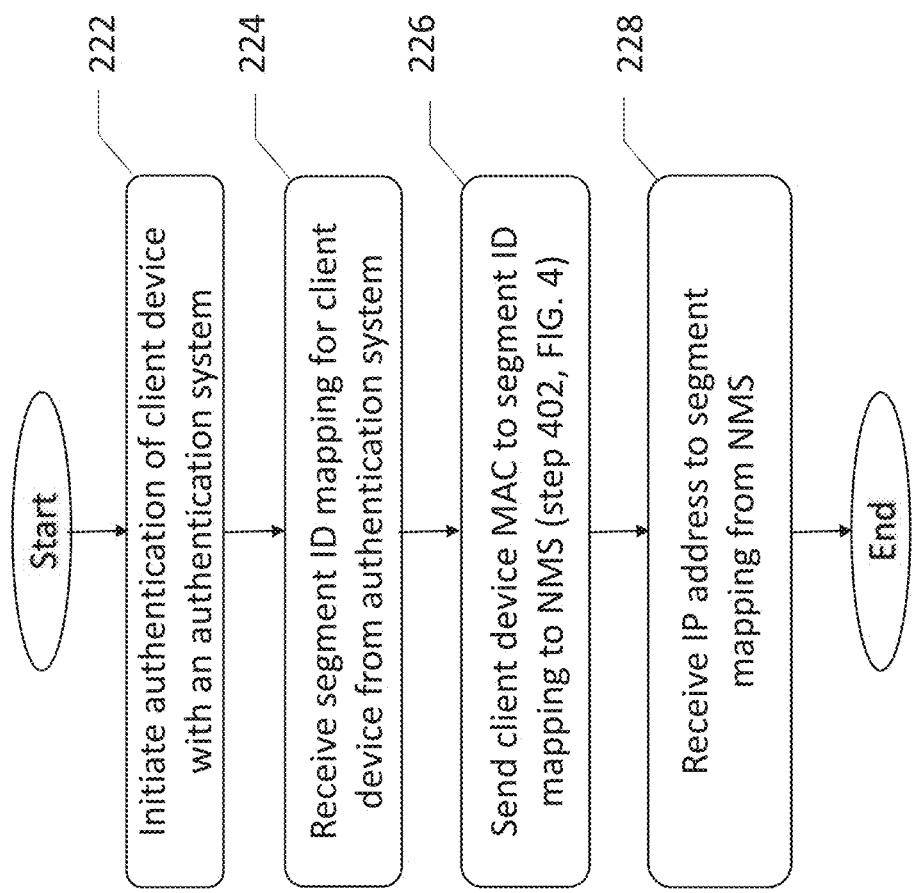
FIG. 2B shows a method, performed by a network device, for transmitting a medium access control (MAC) to segment identification (ID) mapping to a network management system (NMS) in accordance with one or more embodiments of the disclosure.

FIG. 2B shows a method, performed by a network device, for transmitting a MAC to segment ID mapping to a NMS in accordance with one or more embodiments of the disclosure. The method shown in FIG. 2B describes an alternate approach for obtaining an IP address to segment ID mapping in accordance with one or more embodiments of the disclosure. While the various steps in the flowchart shown in FIG. 2B are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

With reference to FIG. 2B, at step 222, a network device initiates authentication of a client device (e.g., one of the client devices 106, FIG. 1) with an authentication system (e.g., 108, FIG. 1). In another embodiment of the disclosure, authentication may be initiated by the client device. At step 224, the network device receives a segment ID mapping for the client device from the authentication system. In an embodiment of the disclosure, the segment ID mapping is a mapping of the MAC address of the client device and the segment ID identifying an accessed segment, for example, a segment named "employee," as described above. At step 226, the network device sends the MAC address to IP mapping to a network management system (NMS) (110, FIG. 1), as also shown at step 402 of FIG. 4. After the NMS receives or determines the IP address-MAC address mapping and the MAC address to segment ID mapping, the NMS may generate the IP address to Segment ID mapping. At step 228, the network device receives the IP address to segment ID mapping from the NMS.

Figure 3A:
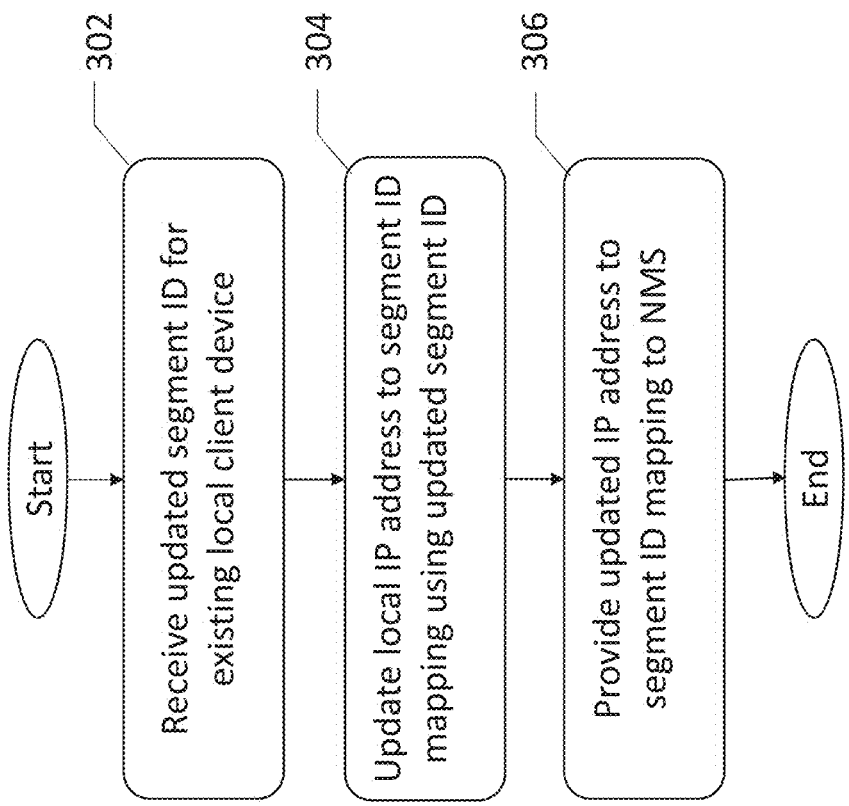
FIG. 3A shows a method, performed by a network device, for updating and providing an IP address to segment identification (ID) mapping to a network management system (NMS) in accordance with one or more embodiments of the disclosure.

FIG. 3A shows a method, performed by a network device, for updating and providing an IP address to segment ID mapping to a NMS in accordance with one or more embodiments of the disclosure. While the various steps in the flowchart shown in FIG. 3A are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

With reference to FIG. 3A, at step 302, a network device receives, e.g., from the authentication system, an updated segment ID for an existing local client device (e.g., one of the client devices 106, FIG. 1). For example, in the case where the client device is moved from one segment to another segment or the client device is added to or removed from a segment, a network device (e.g., one of the network devices 104, FIG. 1) might receive an updated segment ID identifying the affected corresponding segment from an authentication system (e.g., 108, FIG. 1). The client device may be moved from one segment to another segment for a variety of reasons including, without limitation, the following two scenarios: (i) the network device is new to the network, connects to the network with a default security posture, and is later assessed and granted a different level of access; and (ii) the network device was on the network at a certain mapping, but then assessed with a risk, downgrading it to a more strict security level, or vice versa. Both scenarios result in a new mapping.

At step 304, the network device updates its local IP address to segment ID mapping to reflect the updated segment ID of step 302. At step 306, the network device provides the updated IP address to segment ID mapping to the NMS (e.g., 110, FIG. 1).

A local IP address to segment ID mapping is mapping information stored in association with a corresponding network device. For example, in FIG. 1, the local IP address to segment ID mappings may include the IP address to segment ID mappings of all of the client devices that are directly connected to the network device. In some embodiments of the disclosure, the mapping information is maintained internally to the network device. In some embodiments of the disclosure, the mapping information may be maintained externally to the network device.

Figure 3B:
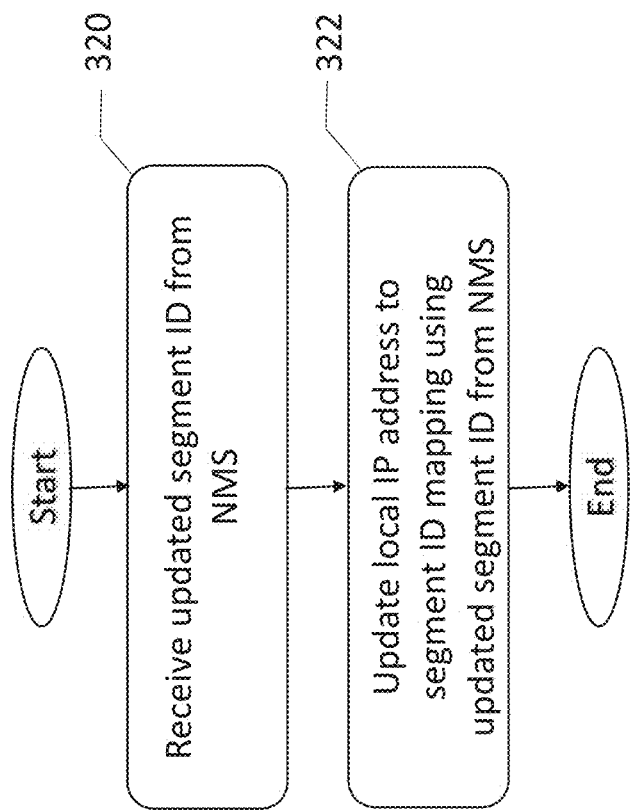
FIG. 3B shows a method, performed by a network device, for updating and providing an internet protocol (IP) address to segment identification (ID) mapping to a network management system (NMS) in accordance with one or more embodiments of the disclosure.

FIG. 3B shows a method, performed by a network device, for updating and providing an IP address to segment ID mapping to a NMS in accordance with one or more embodiments of the disclosure. [DA4] The method shown in FIG. 3B describes an alternate approach for obtaining an IP address to segment ID mapping in accordance with one or more embodiments of the disclosure. While the various steps in the flowchart shown in FIG. 3B are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

With reference to FIG. 3B, at step 320, a network device receives, e.g., from a network management system (NMS) (110, FIG. 1), an updated segment ID for an existing local client device (e.g., one of the client devices 106, FIG. 1). For example, in the case where the client device is moved from one segment to another segment or the client device is added to or removed from a segment, a network device (e.g., one of the network devices 104, FIG. 1) might receive an updated segment ID, from the NMS, identifying the affected corresponding segment that may be received from an authentication system (e.g., 108, FIG. 1). At step 322, the network device updates its local IP address to segment ID mapping to reflect the updated segment ID of step 322.

Figure 4:
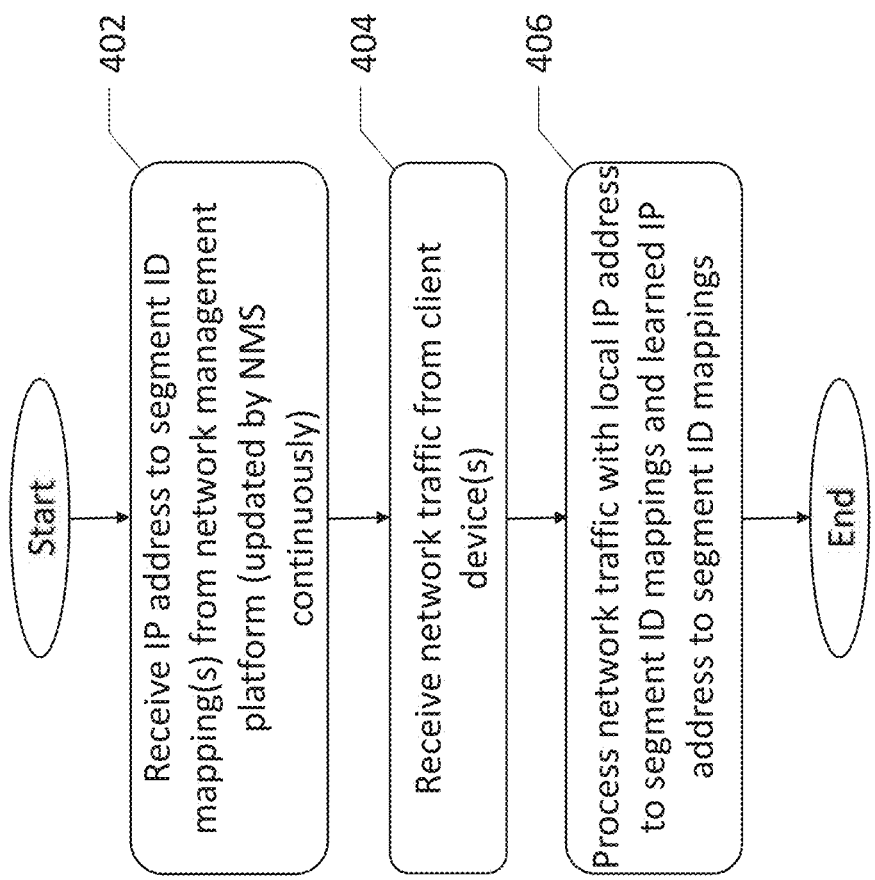
FIG. 4 shows a method, performed by a network device, for processing network traffic in accordance with one or more embodiments of the disclosure.

FIG. 4 shows a method, performed by a network device, for processing network traffic in accordance with one or more embodiments of the disclosure. While the various steps in the flowchart shown in FIG. 4 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In accordance with some embodiments of the disclosure, the NMS (e.g., 110, FIG. 1) continuously updates the IP address to segment ID mapping information for one or more network devices (e.g., 104, FIG. 1) in a network (e.g., 100, FIG. 1). That is, each time the IP address to segment ID mapping of a network device changes, the NMS is made aware of or knows of the change and the NMS may at some periodic or aperiodic rate distribute the IP address to segment ID mapping of all network devices of the network to the network devices.

With reference to FIG. 4, at step 402, a network device (e.g., one of the network devices 104, FIG. 1) receives one or more updated IP address to segment ID mappings from a network management system (NMS) (e.g., 110, FIG. 1). In some embodiments of the disclosure, as stated above, the NMS continuously and routinely determines the IP address to segment ID mappings for all network components and provides updated IP address to segment ID mapping information to the network device. In an embodiment of the disclosure, the updating is facilitated by a change of authorization (CoA) by the authentication system, such as a RADIUS server. In another embodiment of the disclosure, RADIUS Disconnect Message (DM) can as well be used to disconnect the client to clean up the previous mapping and on subsequent reauthentication, a new mapping is established.

The network device may receive updated IP address to segment ID mapping information as a result of a change to a segment ID. A segment ID may be updated to reflect the occurrence of a link flap or link down event where a link becomes non-operational before resuming operation again. Additionally, a network device may be added to the network causing the segment ID to change. The segment ID may change due to the redistribution or reassignment of network devices of a segment given changes in segment policies, for example. The reasons for updating a segment ID are too numerous to list here and will be appreciated by those skilled in the art. At step 404, the network device receives network traffic from a client device (e.g., one of the client devices 106, FIG. 1). At step 406, the network device processes the received network traffic using one or more local IP address to segment ID mappings and learned IP address to segment ID mappings. For example, the local IP address to segment ID mapping may be stored in the network device after the network device determines the IP address to segment ID mapping in accordance with step 206 of FIG. 2A. Alternatively, the saved IP address to segment ID mapping may be a learned IP address to segment ID mapping originating from a client device, such as discussed above relative to step 224 of FIG. 2B. Yet alternatively, the network device may learn of an updated IP address to segment ID mapping from a NMS in accordance with step 304 of FIG. 3A. Local and learned IP address to segment ID mapping information are not limited to the above scenarios which are presented merely for illustrative purposes.

As discussed above, embodiments of the disclosure may be implemented using computing devices. FIG. 5 shows a diagram of a computing device in accordance with one or more embodiments of the disclosure. The computing device (500) may implement an embodiment of one of the network devices (e.g., 104, FIG. 1). The computing device (500) may include one or more computer processors (510), non-persistent storage (506) (e.g., volatile memory, such as random access memory (RAM), cache memory), persistent storage (508) (e.g., a hard disk, an optical drive such as a compact disk (CD) drive or digital versatile disk (DVD) drive, a flash memory, etc.), a communication interface (512) (e.g., Bluetooth® interface, infrared interface, network interface, optical interface, etc.), input devices (504), output devices (502), and numerous other elements (not shown) and functionalities. Each of the components illustrated in FIG. 5 is described below.

In one embodiment of the disclosure, the computer processor(s) (510) may be an integrated circuit for processing instructions. For example, the computer processor(s) may be one or more cores or micro-cores of a processor. The computing device (500) may also include one or more input devices (504), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the disclosure, the computing device (500) may include one or more output devices (502), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (510), non-persistent storage (506), and persistent storage (508). Many different types of computing devices exist, and the aforementioned input and output device(s) may take other forms.

Specific embodiments have been described with reference to the accompanying figures. In the above description, numerous details are set forth as examples. It will be understood by those skilled in the art, and having the benefit of this Detailed Description, that one or more embodiments described herein may be practiced without these specific details and that numerous variations or modifications may be possible without departing from the scope of the embodiments. Certain details known to those of ordinary skill in the art may be omitted to avoid obscuring the description.

In the above description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method of creating segment mapping in a network, the method comprising:
   receiving, by a network device, a segment identification (ID) for a client device of the network from an authentication system, wherein the segment ID identifies a segment of the network including the client device and the network device and wherein the segment ID is associated with a Media Access Control (MAC) address of the client device;
   using the MAC address, determining an internet protocol (IP) address of the client device;
   creating, by the network device, an IP address to segment ID mapping for the client device using the IP address;
   providing the IP address to segment ID mapping to a network management system (NMS) for distribution to one or more remaining network devices of the network; and
   processing at least one packet from the client device using the IP address to segment ID mapping.

2. The method of claim 1, wherein the IP address of the client device is mapped to the MAC address of the client device using IP address locking, wherein the network device uses the mapping of the MAC address of the client device to the IP address of the client device to generate the IP address to segment ID mapping.

3. The method of claim 2, wherein the client device and the network device are directly coupled.

4. The method of claim 1, wherein the IP address to segment mapping is distributed to a second network device in the network.

5. The method of claim 1, further comprising:
   receiving, by the network device and from an authentication system, an updated segment ID for the client device;
   updating, by the network device, the IP address to segment ID mapping to reflect the updated segment ID; and
   providing the updated IP address to segment ID mapping to the NMS.

6. The method of claim 1, wherein the IP address to segment ID mapping is distributed to distinct network devices in the network and each of the distinct network devices is authenticated by the authentication system prior to the distribution of the IP address to segment ID mapping to the distinct network devices.

7. A method of segment mapping in a network, the method comprising:
   receiving, by a network device, a segment identification (ID) for a client device of the network from an authentication system, wherein the segment ID identifies a segment of the network including the client device and the network device and wherein the segment ID is associated with a Media Access Control (MAC) address of the client device;
   sending the segment ID and the MAC address of the client device to a network management system (NMS) for determining an internet protocol (IP) address of the client device, wherein after the IP address to segment ID mapping is determined by the NMS, the IP address to segment ID mapping is distributed to at least one network device in the network; and
   receiving, by the network device, the IP address to segment ID mapping for the NMS.

8. The method of claim 7, wherein the IP address of the client device is mapped to the MAC address of the client device using IP address locking, wherein the network device uses the mapping of the MAC address of the client device to the IP address of the client device to generate the IP address to segment ID mapping.

9. The method of claim 7, wherein the client device and the network device are directly coupled.

10. The method of claim 7, wherein the IP address to segment mapping is distributed to a second network device in the network.

11. The method of claim 7, further comprising:
receiving, by the network device and from an authentication system, an updated segment ID for the client device;
updating, by the network device, the IP address to segment ID mapping to reflect the updated segment ID; and
providing the updated IP address to segment ID mapping to the NMS.

12. The method of claim 7, wherein the IP address to segment ID mapping is distributed to distinct network devices in the network and each of the distinct network devices is authenticated by the authentication system prior to the distribution of the IP address to segment ID mapping to the distinct network devices.

13. A network device, comprising:
network device hardware comprising a processor; and
memory comprising instructions which, when executed by the processor, performs a method for creating segment mapping in a network, the method comprising:
receiving, by a network device, a segment identification (ID) for a client device of the network from an authentication system, wherein the segment ID identifies a segment of the network including the client device and the network device and wherein the segment ID is associated with a Media Access Control (MAC) address of the client device;
determining an internet protocol (IP) address of the client device;
creating, by the network device, an IP address to segment ID mapping for the client device using the IP address;
providing the IP address to segment ID mapping to a network management system (NMS) for distribution to one or more remaining network devices of the network; and
processing at least one packet from the client device using the IP address to segment ID mapping.

14. The network device of claim 13, wherein the IP address of the client device is mapped to the MAC address of the client device using IP address locking, wherein the network device uses the mapping of the MAC address of the client device to the IP address of the client device to generate the IP address to segment ID mapping.

15. The network device of claim 14, wherein the client device and the network device are directly coupled.

16. The network device of claim 14, wherein the IP address to segment mapping is distributed to a second network device in the network.

17. The network device of claim 13, further comprising:
receiving, by the network device and from an authentication system, an updated segment ID for the client device;
updating, by the network device, the IP address to segment ID mapping to reflect the updated segment ID; and
providing the updated IP address to segment ID mapping to the NMS.

18. The network device of claim 13, wherein the IP address to segment ID mapping is distributed to distinct network devices in the network and each of the distinct network devices is authenticated by the authentication system prior to the distribution of the IP address to segment ID mapping to the distinct network devices.

19. A non-transitory computer readable medium comprising computer readable program code, which when executed by a processor enables the processor to perform a method, the method comprising:
receiving, by a network device, a segment identification (ID) for a client device of the network from an authentication system, wherein the segment ID identifies a segment of the network including the client device and the network device and wherein the segment ID is associated with a Media Access Control (MAC) address of the client device;
determining an internet protocol (IP) address of the client device;
creating, by the network device, an IP address to segment ID mapping for the client device using the IP address;
providing the IP address to segment ID mapping to a network management system (NMS) for distribution to one or more remaining network devices of the network; and
processing at least one packet from the client device using the IP address to segment ID mapping.

20. The non-transitory computer readable medium comprising computer readable program code of claim 19, wherein the IP address of the client device is mapped to the MAC address of the client device using IP address locking, wherein the network device uses the mapping of the MAC address of the client device to the IP address of the client device to generate the IP address to segment ID mapping.

* * * * *